United States Patent
Shiobara et al.

(10) Patent No.: US 12,545,933 B2
(45) Date of Patent: Feb. 10, 2026

(54) GLUCOSE PRODUCTION METHOD AND ETHANOL PRODUCTION METHOD

(71) Applicant: HONDA MOTOR CO., LTD., Tokyo (JP)

(72) Inventors: Nozomi Shiobara, Tochigi-ken (JP); Shohei Kinoshita, Tochigi-ken (JP); Mizuho Doi, Tochigi-ken (JP); Kenji Machida, Tochigi-ken (JP); Minoru Goto, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 603 days.

(21) Appl. No.: 17/913,858

(22) PCT Filed: Mar. 24, 2021

(86) PCT No.: PCT/JP2021/012191
§ 371 (c)(1),
(2) Date: Sep. 23, 2022

(87) PCT Pub. No.: WO2021/200451
PCT Pub. Date: Oct. 7, 2021

(65) Prior Publication Data
US 2023/0114259 A1  Apr. 13, 2023

(30) Foreign Application Priority Data
Mar. 30, 2020 (JP) .................................. 2020-059959

(51) Int. Cl.
| | |
|---|---|
| C12P 7/14 | (2006.01) |
| C12N 1/12 | (2006.01) |
| C12N 9/26 | (2006.01) |
| C12N 9/34 | (2006.01) |
| C12P 19/02 | (2006.01) |
| C12R 1/89 | (2006.01) |

(52) U.S. Cl.
CPC ................ *C12P 7/14* (2013.01); *C12N 1/125* (2021.05); *C12N 9/2414* (2013.01); *C12N 9/2428* (2013.01); *C12P 19/02* (2013.01); *C12R 2001/89* (2021.05)

(58) Field of Classification Search
CPC .... C12P 7/14; C12P 19/14; C12P 7/06; C12P 19/20; C12N 1/125; C12N 9/2414; C12N 9/2428; C12N 19/02; C12N 1/12; C12R 2001/89; Y02E 50/10; C13K 1/06
See application file for complete search history.

(56) References Cited

U.S. PATENT DOCUMENTS

| | | |
|---|---|---|
| 5,578,472 A | 11/1996 | Ueda et al. |
| 2009/0068715 A1 | 3/2009 | Ogaki et al. |
| 2009/0075353 A1 | 3/2009 | Ogaki et al. |
| 2019/0177747 A1 | 6/2019 | Shiobara et al. |

FOREIGN PATENT DOCUMENTS

| | | | |
|---|---|---|---|
| CN | 110894512 | 3/2020 | |
| JP | 07-031485 | 2/1995 | |
| JP | 10-290698 | 11/1998 | |
| JP | WO 2017/217116 | * 12/2017 | ............... C12N 1/12 |
| KR | 20130123246 | 11/2013 | |
| KR | 20140014560 | 2/2014 | |
| WO | 2017/217116 | 12/2017 | |

OTHER PUBLICATIONS

Choi et al., Enzymatic pretreatment of Chlamydomonas reinhardtii biomass for ethanol production. Bioresource Technol., 2010, vol. 101: 5330-5336. (Year: 2010).*
Japanese Office Action for Japanese Patent Application No. 2022-512019 dated Jul. 11, 2023.
International Search Report and Written Opinion for International Application No. PCT/JP2021/012191 mailed on Jun. 22, 2021, 9 pages.
Chinese Office Action and Search Report for Chinese Patent Application No. 202180026613.0 dated Mar. 24, 2025.

* cited by examiner

*Primary Examiner* — Ganapathirama Raghu
(74) *Attorney, Agent, or Firm* — Amin, Turocy & Watson, LLP

(57) ABSTRACT

The present invention can: efficiently and readily produce glucose from microalgae that accumulate starch in their cells; and obtain ethanol. During a preparation step of the glucose production method, microalgae are prepared on which a saccharifying enzyme acts on starch accumulated inside the microalgae cells, without disrupting the cell walls. In a saccharification step, starch inside the cells is saccharified and glucose is generated, by adding a saccharifying enzyme to the microalgae without a disruption treatment. The ethanol production method has a step in which, after the saccharification step, the glucose undergoes alcoholic fermentation and ethanol is generated.

4 Claims, 1 Drawing Sheet

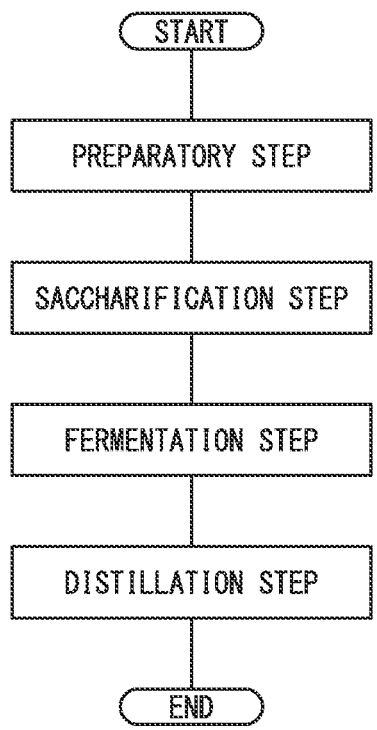

GLUCOSE PRODUCTION METHOD AND ETHANOL PRODUCTION METHOD

TECHNICAL FIELD

The present invention relates to a glucose production method and an ethanol production method using microalgae that accumulate starch within their cells.

BACKGROUND ART

As a so-call biofuel, ethanol, which is derived from glucose produced using microalgae that accumulate starch within their cells, is known. Microalgae of this type generally have a strong cell wall. Therefore, in order to utilize the starch accumulated within the cells, it is necessary to consume a lot of energy to mechanically crush the cell walls, or to chemically crush (dissolve) the cell walls using an expensive enzyme such as cellulase.

Thus, for example, in JP H10-290698 A, a method is proposed for producing ethanol that does not require a cell wall crushing process. In such a production method, microalgae are used that have the ability to decompose intracellular starch into glucose in a dark and anaerobic atmosphere. More specifically, by maintaining a slurry in which such microalgae are contained in a dark and anaerobic atmosphere over a period of several days, the glucose can be generated without undergoing a cell wall crushing process. Ethanol is produced by causing the glucose, which was generated in the foregoing manner, to undergo fermentation using an alcohol-fermenting microorganism.

SUMMARY OF THE INVENTION

In the above-described ethanol production method, it has been difficult to efficiently and easily produce glucose, and thereby efficiently and easily obtain ethanol, because a step is required of maintaining the slurry in which the microalgae are contained in a dark and anaerobic atmosphere over a period of several days.

The present invention has been devised in view of such a circumstance, and has the object of providing a glucose production method and an ethanol production method which are capable of efficiently and easily producing glucose from microalgae that accumulate starch within their cells.

One aspect of the present invention is characterized by a glucose production method, comprising a preparatory step of preparing microalgae in which a saccharifying enzyme acts on starch accumulated within cells thereof without a crushing process of cell walls being performed, and a saccharification step of saccharifying the starch within the cells to generate glucose by adding the saccharifying enzyme to the microalgae without implementing the crushing process.

Another aspect of the present invention is characterized by an ethanol production method, comprising a fermentation step of causing the glucose obtained by the above-described glucose production method to undergo alcoholic fermentation to thereby generate ethanol.

In the glucose production method, microalgae are used in which the saccharifying enzyme is allowed to act on the starch within their cells without the cell wall crushing process being performed due to thinning or partial damage to the cell walls. By directly adding the saccharifying enzyme to the microalgae without implementing the crushing process, the starch within the cells is saccharified and the glucose is thereby generated. Therefore, because a step of implementing the crushing process on the cell walls, and a step of maintaining the microalgae under a dark and anaerobic atmosphere over a period of several days can be rendered unnecessary, it becomes possible to efficiently and easily produce the glucose from the microalgae that accumulate starch within their cells, and thus to efficiently and easily produce the ethanol.

BRIEF DESCRIPTION OF DRAWINGS

FIG. 1 is a flow chart illustrating an ethanol production method according to an embodiment of the present invention.

DESCRIPTION OF THE INVENTION

Preferred embodiments of a glucose production method and an ethanol production method according to the present invention will be presented and described in detail below with reference to the accompanying drawings.

In the glucose production method and the ethanol production method according to the present embodiment, microalgae which have a photosynthetic ability and are capable of accumulating starch within their cells as a photosynthetic product are used. As microalgae of this type, there may be cited, for example, microalgae that are classified as Chlorophyceae of the Phylum Chlorophyta, and more specifically, *Chlamydomonas reinhardtii* belonging to the genus *Chlamydomonas* of the class Chlorophyceae.

Further, the microalgae that are used in the glucose production method and the ethanol production method according to the present embodiment have, in addition to being capable of accumulating starch within their cells, a property such that the saccharifying enzyme is allowed to act on the starch within their cells without a cell wall crushing process being performed. The crushing process refers to various processes for crushing the cell walls of the microalgae, including mechanical, physical, chemical, and enzymatic crushing processes. As examples of such a crushing process, there may be cited an ultrasonic process, a stirring process using a vortex mixer, an acid process, an alkali process, and a dissolution process using an enzyme such as cellulase. The saccharifying enzyme refers to various enzymes that are capable of saccharifying starch to thereby generate glucose, and as examples of such enzymes, there may be cited α-amylase and glucoamylase.

As examples of the microalgae that have such a property, there may be cited a mutant strain of the genus Chlamydomonas in which at least one of thinning or partial damage to the cell walls occurs. For example, as one example of a cell wall thickness of the mutant strain in which the cell walls are made thinner, there may be cited a cell wall thickness of 0.08 to 0.10 μm. Further, as a suitable example of the mutant strain in which the cell walls are made thinner, although not particularly limited to such a mutant strain, there may be cited the "Honda DREAMO Strain" (accession date Apr. 22, 2016, accession number FERM BP-22306), deposited at the National Institute of Technology and Evaluation, International Patent Organism Depositary (Room 120, 2-5-8 Kazusakamatari, Kisarazu City, Chiba Prefecture, Japan).

Hereinafter, the above-described microalgae, which are capable of accumulating starch within their cells, and in which the saccharifying enzyme is allowed to act on the starch within their cells without the crushing process being performed, may also be simply referred to as "microalgae". As shown in FIG. 1, the glucose production method according to the present embodiment includes a preparatory step and a saccharification step. The ethanol production method according to the present embodiment includes, in addition to the aforementioned steps, a fermentation step and a distillation step. In the preparatory step, the microalgae in which starch is accumulated within their cells are prepared. In the saccharification step, by adding a saccharifying enzyme to the microalgae that have been prepared in the preparatory step, without implementing a cell wall crushing process, the starch within the cells is saccharified and glucose is thereby generated.

In the saccharification step, one type or two or more types of the saccharifying enzyme that are capable of saccharifying the starch can be used. As preferred examples of such a saccharifying enzyme, there may be cited α-amylase and glucoamylase, and it is more preferable to use such saccharifying enzymes in combination.

Further, in the saccharification step, the temperature in the interior of a non-illustrated saccharification tank in which saccharification is performed is preferably maintained at 40 to 50° C., for example. In this case, it becomes possible to allow the saccharifying enzyme to act more effectively on the starch within the cells of the microalgae to thereby promote saccharification.

As discussed previously, the cell walls of the microalgae undergo at least one of thinning or partial damage. For this reason, it is considered that, even in a state in which the crushing process is not implemented, the saccharifying enzyme is capable of acting on the starch within the cells via the portions of the cell walls that have been made thinner, or the portions of the cell walls that have been partially damaged.

In this instance, since the starch prior to the saccharifying enzyme acting thereon has a structure in which glucoses, which are monosaccharides, are connected, and has a large molecular weight, it is presumed that outflowing of the starch to the exterior of the cells from the aforementioned portions of the cell walls that have been made thinner or the portions of the cell walls that have been partially damaged can be suppressed.

Glucose is generated when the starch is decomposed in the cells due to the action of the saccharifying enzyme. Since the glucose has a smaller molecular weight than the starch, it becomes possible for the glucose to flow out to the exterior from the aforementioned portions of the cell walls that have been made thinner or the portions of the cell walls that have been partially damaged. In other words, in the saccharification step, the glucose generated within the cells can be extracted to the exterior of the cells, without the crushing process being implemented on the microalgae. Moreover, the glucose that has flowed out to the exterior of the cells, and the cells (the cell walls) exist within the saccharified solution in a separable state.

In the fermentation step, the glucose obtained in the saccharification step is subjected to alcoholic fermentation, and ethanol is thereby generated. The method of alcoholic fermentation is not particularly limited, but the method can be carried out, for example, by using one type or two or more types of microorganisms that decompose the glucose and thereby generate ethanol and carbon dioxide. As one example of this type of alcohol-fermenting microorganism, there may be cited a leavening agent such as yeast.

In the distillation step, ethanol that is generated in the fermentation step and contains cells (cell walls) is distilled, and is separated into ethanol and waste water in which the cells are contained. Although not particularly limited to this feature, in the distillation method, for example, an Older-shaw-distillation column can be used. Moreover, according to the present embodiment, although the cells are separated from the ethanol in the distillation step, alternatively or together with this feature, the cells may be separated from the saccharified solution after the saccharification step. Although not particularly limited to this feature, as for the method of separating the saccharified solution that contains the glucose and the cells, various methods can be adopted such as, for example, natural sedimentation by being left standing, centrifugation, and sieving (straining).

In accordance with the glucose production method according to the present embodiment, the glucose can be produced through the preparatory step and the saccharification step described above. Further, in accordance with the ethanol production method according to the present embodiment, the ethanol can be produced by further performing the fermentation step and the distillation step. In the glucose production method and the ethanol production method, as noted previously, the microalgae are used in which the saccharifying enzyme is allowed to act on the starch within their cells without the cell wall crushing process being performed due to thinning or partial damage to the cell walls. By directly adding the saccharifying enzyme to the microalgae without implementing the crushing process, the starch within the cells is saccharified and the glucose is thereby generated. Therefore, because a step of implementing the crushing process on the cell walls, and a step of maintaining the microalgae under a dark and anaerobic atmosphere over a period of several days can be rendered unnecessary, it is possible to efficiently and easily produce the glucose from the microalgae that accumulate starch within their cells. Hence, the ethanol can be produced efficiently and easily.

In the glucose production method and the ethanol production method described above, the microalgae are used in which the saccharifying enzyme is allowed to act on the starch within their cells without the cell wall crushing process being performed due to the thinning or the partial damage to the cell walls. Since the microalgae contain the cell walls, the microalgae are more tolerant to the environment, in comparison with microalgae that do not contain or substantially do not contain any of such cell walls. Thus, in the preparatory step, since the microalgae are capable of being cultured outdoors, or cultured using, as a nutrient, a carbon dioxide gas emitted from a factory or the like, the microalgae in which the starch is accumulated within their cells can be easily prepared. Therefore, the glucose can be produced more efficiently and easily. Hence, the ethanol can be produced efficiently and easily.

In the saccharification step of the glucose production method according to the above-described embodiment, by using amylase as the saccharifying enzyme, it is possible to easily decompose the starch within the cells of the microalgae to thereby generate the glucose.

In the glucose production method according to the above-described embodiment, the microalgae are microalgae belonging to the genus *Chlamydomonas* of the class Chlorophyceae.

Further, in the glucose production method according to the above-described embodiment, the microalgae are microalgae belonging to *Chlamydomonas reinhardtii*.

In these cases, due to photosynthesis, the starch can be satisfactorily accumulated within the cells of the microalgae, and it becomes possible to efficiently produce the glucose.

In the glucose production method according to the above-described embodiment, by the microalgae being the Honda DREAMO strain (accession number FERM BP-22306), the saccharifying enzyme can be made to act satisfactorily on the starch within the cells without performing the crushing process.

The ethanol production method according to the above-described embodiment includes the fermentation step of causing the glucose obtained by the glucose production method to undergo alcoholic fermentation to thereby generate the ethanol. In accordance with this feature, the ethanol can be efficiently and easily produced from the glucose obtained through the saccharification step and the separation step.

In the ethanol production method according to the above-described embodiment, the ethanol obtained through the fermentation step is distilled to thereby separate the ethanol and the cells. By separating the ethanol and the cells in the distillation step, high-concentration ethanol is capable of being generated, without newly performing a step of separating the cells.

The present invention is not particularly limited to the embodiments described above, and various modifications can be made thereto within a range that does not depart from the essence and gist of the present invention.

Exemplary Embodiment

Hereinafter, the present invention will be described in greater detail below with reference to an exemplary embodiment, but the present invention is not limited to the scope of the exemplary embodiment described below.

Preparatory Step

Microalgae of the Honda DREAMO strain were cultured under irradiation of light. By being irradiated with sunlight or artificial light, the light condition at the time of culturing may be, for example, on the order of 5 to 1000 µmol/m²-sec, and more preferably, on the order of 150 to 300 µmol/m²-sec. The temperature condition at the time of culturing may be, for example, on the order of 5 to 40° C., and more preferably, on the order of 25 to 30° C. The pH condition of the culturing medium at the time of culturing may be a pH on the order of 5 to 9, and more preferably, a pH on the order of 7. As the culturing medium, a culturing medium having a general composition can be used. By concentrating the microalgae, which have been cultured in the manner described above, by way of centrifugation, an alga body slurry having a microalgae concentration of 90 g/L and a starch concentration of 23 g/L was obtained.

Saccharification Step

After performing a washing process two times on the alga body slurry using a sodium acetate buffer (50 mmol/L, Ph of 5.0), α-amylase and glucoamylase were added thereto as saccharifying enzymes. More specifically, the saccharifying enzymes were added to the alga body slurry at a ratio of 1.0 g of α-amylase and 0.25 g of glucoamylase with respect to 1 kg of the alga body slurry.

The alga body slurry to which the saccharifying enzymes were added was maintained at 50° C. in a warm water bath and stirred with a stirrer over a period of 24 hours, whereby the saccharifying enzymes were allowed to act on the starch within the cells of the microalgae in order to perform saccharification. More specifically, in the saccharification step, the saccharifying enzymes were directly added to the microalgae without implementing the crushing process, and the starch within the cells of the microalgae was saccharified. As a result, the saccharified solution containing 23 g/L of glucose was generated.

Fermentation Step

A fermented bacteria solution at 1% by weight of the saccharified solution obtained in the saccharification step was added to the saccharified solution. As the fermented bacteria solution, a yeast solution which was adjusted in the following manner was used. Specifically, in the case of the saccharified solution being 5000 mL, 50 g/L of a YPD medium to which 50 mL of the alga body slurry was added was used, and 1.5 g of the yeast was pre-cultured under an aerobic condition. During the pre-culturing, a state in which aeration and stirring with a stirrer were carried out inside a constant temperature bath at 35° C. was maintained over a period of 24 hours.

Next, after the culture solution obtained at the time of pre-culturing was diluted to 500 mL with the YPD medium, main culturing was carried out over a period of 24 hours under the same conditions as during pre-culturing. After centrifuging 500 mL of the culture solution obtained at the time of the main culturing, the yeast existing in the sediment layer was recovered by discarding a supernatant. The yeast was diluted to 50 mL with the YPD medium, thereby obtaining a yeast solution (fermented bacteria solution).

A degassing and nitrogen substitution process was performed on the saccharified solution to which the yeast solution was added. Thereafter, the saccharified solution was maintained at 30 to 35° C. in the constant temperature bath under an anaerobic fermentation condition, and was stirred over a period of 24 hours with the stirrer, whereby the glucose within the saccharified solution was subjected to alcoholic fermentation. As a result, a fermented solution containing 11 g/L of ethanol (with an ethanol concentration of 1.1% by weight) was obtained.

Distillation Step

The fermented solution obtained in the fermentation step was distilled using a ten plate Oldershaw distillation column, whereby the cells were separated therefrom, and a distillate with an ethanol concentration of 90.0% by weight was obtained. Zeolite (product name "Molecular Sieve 3A 1/16" manufactured by Kanto Chemical Co., Inc.) was immersed in the distillate at a ratio of 1:1, and was left standing over a period of 24 hours in order to perform a dehydration process. As a result, 99.7% by weight of ethanol (containing C3 to C6 olefins) could be obtained.

From the above, in accordance with the glucose production method and the ethanol production method according to the present embodiment, by adding the saccharifying enzymes to the microalgae without implementing the cell wall crushing process, the glucose can be easily and efficiently produced, and from such glucose, the ethanol can be easily and efficiently obtained.

What is claim is:
1. A glucose production method, comprising:
a preparatory step of preparing microalgae having cell walls which block starch accumulated within cells thereof from flowing out; and
a saccharification step of saccharifying the starch within the cells to generate glucose by adding a saccharifying enzyme that acts on the starch within the cells without crushing the cell walls, to the microalgae in which the cell walls have not been crushed, wherein
the microalgae are microalgae of a Honda DREAMO strain (accession number FERM BP-22306),
the saccharifying enzyme comprises a-amylase and glucoamylase,
in the saccharification step, a mixture of the microalgae and the saccharifying enzyme is maintained at 40° C. to 50° C., and
the saccharifying enzyme acts on the starch within the cells to generate glucose having a molecular weight smaller than the starch, and the glucose flows out to an exterior of the cells through the cell walls.

2. An ethanol production method, comprising a fermentation step of causing glucose obtained by a glucose production method to undergo alcoholic fermentation to thereby generate ethanol,
the glucose production method comprising:
a preparatory step of preparing microalgae having cell walls which block starch accumulated within cells thereof from flowing out; and
a saccharification step of saccharifying the starch within the cells to generate the glucose by adding a saccharifying enzyme that acts on the starch within the cells without crushing the cell walls, to the microalgae in which the cell walls have not been crushed,
wherein the microalgae are microalgae of a Honda DREAMO strain (accession number FERM BP-22306), and
wherein the saccharifying enzyme acts on the starch within the cells to generate glucose having a molecular weight smaller than the starch, and the glucose out to an exterior of the cells through the cell walls.

3. The ethanol production method according to claim 2, further comprising a distillation step of separating the ethanol and the cells by distilling the ethanol obtained in the fermentation step.

4. The glucose production method according to claim 1, wherein the microalgae has a cell wall thickness of 0.08 μm to 0.10 μm.

* * * * *